US009544549B2

(12) United States Patent
Vovkushevsky et al.

(10) Patent No.: US 9,544,549 B2
(45) Date of Patent: Jan. 10, 2017

(54) METHOD FOR GENERATING AN IMAGE OF THE SURROUNDINGS OF A VEHICLE AND IMAGING DEVICE

(75) Inventors: Vsevolod Vovkushevsky, Bietigheim-Bissingen (DE); Jens Bammert, Stuttgart (DE); Tobias Geiger, Bietigheim-Bissingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 345 days.

(21) Appl. No.: 13/884,573

(22) PCT Filed: Oct. 26, 2011

(86) PCT No.: PCT/EP2011/068728
§ 371 (c)(1),
(2), (4) Date: May 9, 2013

(87) PCT Pub. No.: WO2012/062573
PCT Pub. Date: May 18, 2012

(65) Prior Publication Data
US 2013/0229524 A1 Sep. 5, 2013

(30) Foreign Application Priority Data
Nov. 12, 2010 (DE) .......................... 10 2010 051 206

(51) Int. Cl.
*H04N 7/18* (2006.01)
*B60R 1/00* (2006.01)
*G06T 3/40* (2006.01)

(52) U.S. Cl.
CPC ................. *H04N 7/183* (2013.01); *B60R 1/00* (2013.01); *G06T 3/4038* (2013.01);
(Continued)

(58) Field of Classification Search
CPC .......... H04N 7/18; H04N 7/183; H04N 7/188; B60R 1/00; B60R 2300/301; B60R 2300/303; B60R 2300/305; B60R 2300/607; B60R 2300/806; G06T 3/4038; G06T 15/205; B62D 15/0275; B62D 15/027
(Continued)

(56) References Cited

U.S. PATENT DOCUMENTS 7,212,653 B2    5/2007  Sato et al
7,317,813 B2 *  1/2008  Yanagawa ................. B60R 1/00
                                                        340/435
(Continued)

FOREIGN PATENT DOCUMENTS

DE    102006000245 A1    1/2007
EP         1094337 B1    3/2004
JP       2006-268076 A  10/2006

OTHER PUBLICATIONS

International Search Report issued in PCT/EP2011/068728 mailed Jan. 26, 2012 (4 pages).

*Primary Examiner* — Trang U Tran
(74) *Attorney, Agent, or Firm* — Osha Liang LLP

(57) ABSTRACT

An imaging device and method for producing an image of a vehicle surroundings of a vehicle with at least one camera includes recording a first partial image in a first position or alignment of the camera and recording at least a second partial image in at least a second position or alignment of the camera, each partial image corresponding to the entire coverage area of the camera. The first partial image and the second partial image are assembled to form the image of the vehicle surroundings such that the image shows a larger area than each partial image. The imaging device includes the
(Continued)

camera and an image synthesis device with which the first partial image and the second partial image can be assembled to form the image.

12 Claims, 4 Drawing Sheets

(52) U.S. Cl.
CPC ... *B60R 2300/301* (2013.01); *B60R 2300/303* (2013.01); *B60R 2300/305* (2013.01); *B60R 2300/607* (2013.01); *B60R 2300/806* (2013.01)

(58) Field of Classification Search
USPC .......................................................... 348/148
See application file for complete search history.

(56) References Cited

U.S. PATENT DOCUMENTS

| | | | |
|---|---|---|---|
| 7,421,095 B2 * | 9/2008 | Ikeda | H04N 7/18 |
| | | | 348/119 |
| 8,754,760 B2 * | 6/2014 | Augst | 340/435 |
| 8,988,250 B2 * | 3/2015 | Suzuki et al. | 340/932.2 |
| 2005/0012685 A1 | 1/2005 | Okada et al. | |
| 2010/0246901 A1 | 9/2010 | Yang | |

* cited by examiner

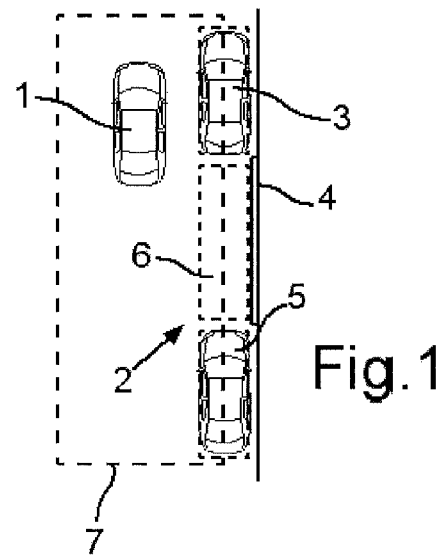
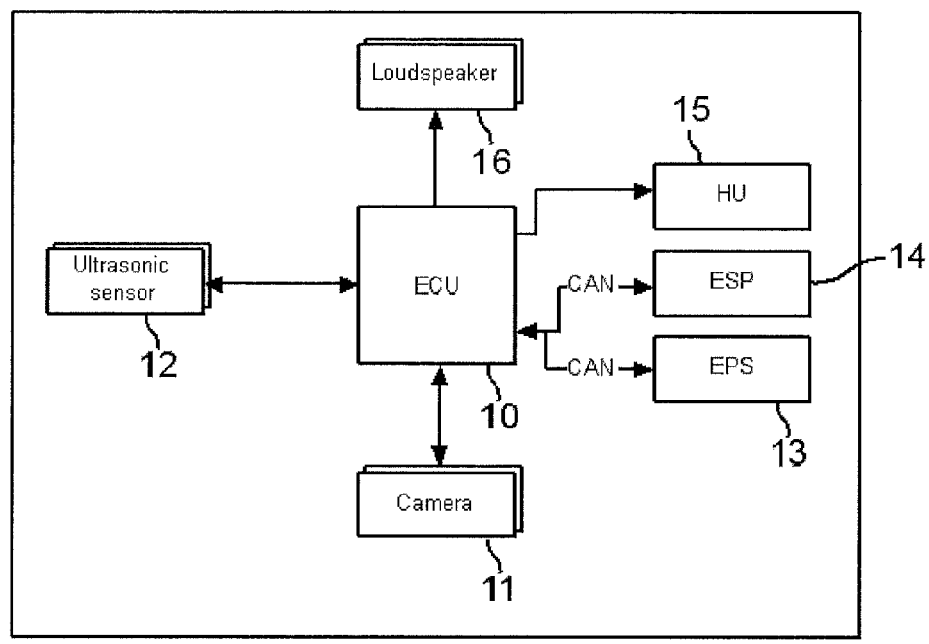

METHOD FOR GENERATING AN IMAGE OF THE SURROUNDINGS OF A VEHICLE AND IMAGING DEVICE

BACKGROUND OF INVENTION

Field of the Invention

The present invention relates to a method for producing an image of a vehicle surroundings of a vehicle with at least one camera by recording a first partial image in a first position or alignment of the camera and recording at least a second partial image in at least a second position or alignment of the camera, each partial image corresponding to the entire coverage area of the camera. Moreover, the present invention relates to an imaging device for producing an image of a vehicle surroundings of a vehicle with an appropriate camera.

Background Art

Vehicles have many driver assistance systems for supporting the driver when operating the vehicle. Such assistance systems include, for example, a parking assistance system, an ACC system, a lane keeping system, a lane changing system, a main beam assistant and the like.

Of these assistance systems, some employ cameras installed in the vehicle to provide the driver with information relating to the surroundings of the vehicle. In this case, either the current image from the camera, or current images from cameras, are displayed individually or in combination, or the individual images are processed such that a virtual image arises from a bird's eye view. Likewise known are systems which employ different sensors (based mainly on ultrasound) to scan the surroundings of the vehicle and to calculate the distances between one's own vehicle and the obstacles, which are used to warn the driver. Likewise known are systems which calculate a trajectory into detected parking spaces, and can maneuver the vehicle semiautomatically into the parking space by driving the steering. When such systems are operated separately, it can be difficult for the driver to assign the warning, or what is happening, to the camera. Moreover, it is not always to be seen from the image which obstacle is critical and which is not.

Printed publication DE 10 2006 000 245 A1 discloses a parking support method and a corresponding device. A navigation device links image data acquired by means of an image data acquisition unit to a position at which the image data were recorded, and stores the data as earlier image data in an image memory. The control unit further determines whether the vehicle has entered at least one designated parking area. If it is determined that the vehicle has entered the designated parking area, then an earlier image is put onto a direction display on the basis of the earlier image data which were recorded from the designated parking area, and a current image is put onto a direction display on the basis of image data obtained at the current position of the vehicle.

Moreover, printed publication U.S. Pat. No. 7,212,653 B2 discloses an image processing system for a vehicle with which images are recorded from the surroundings of the vehicle. The images are stored, and a processed image which is obtained by processing an earlier image which was recorded before an instantaneous position was reached is overlaid on a part of a current image which cannot be detected by the camera.

Furthermore, printed publication EP 1 094 337 B1 describes a system for aiding parking. An image around the vehicle is recorded, and the driver is informed which 3D object is located there. The system has an image recording part for recording, with a single camera during the transition of the vehicle from a first to a second location, first and second images around the vehicle at a first and second location and at a first and second time. Moreover, the system has an object distance calculating part for calculating a distance from the vehicle to the 3D object by using the position of the 3D object in each of the first and second images, and the transition data of the vehicle. Finally, there is provided an image producing device for producing a third image, which is based on the images and the recorded data.

It follows that it is known to produce an image of the vehicle surroundings from a plurality of images recorded sequentially at different vehicle positions by means of a camera system. The sequentially recorded images are either used to determine the distances to obstacles in the camera image, or to fill up image areas covered by obstacles with appropriate sections from past images.

SUMMARY OF INVENTION

One or more embodiments of the present invention is to obtain images of a vehicle surroundings that are more informative, and to use them to support the driver, particularly for a parking assistance.

According to one or more embodiments of the invention, a method and an imaging device are achieved. Advantageous developments of the invention form from the various embodiments described.

Thus, according to one or more embodiments of the invention, there is provided a method for producing an image of a vehicle surroundings of a vehicle with a camera by recording a first partial image in a first position or alignment of the camera and recording of at least a second partial image in at least a second position or alignment of the camera, each partial image corresponding to the entire coverage area of the camera, and the first partial image and the second partial image being assembled to form the image of the vehicle surroundings such that the image shows a larger area than each partial image.

Moreover, an imaging device is proposed for producing an image of a vehicle surroundings of a vehicle, having a camera for recording a first partial image in a first position or alignment, and for recording at least a second partial image in at least a second position or alignment of the camera, each partial image corresponding to the entire coverage area of the camera, and further comprising an image synthesis device with which the first partial image and the second partial image can be assembled to form the image of the vehicle surroundings such that the image shows a larger area than each partial image.

It is therefore advantageously possible to use a plurality of partial images to obtain a larger overall image of a vehicle surroundings which is more informative for the driver. In particular, the driver is thereby capable of better estimating the situation in the surroundings of the vehicle.

In a special embodiment, the image produced can have a virtual viewpoint above the vehicle. It follows that a bird's eye view is provided for the image. Such an image further facilitates the driver in estimating the current situation.

Of particular advantage is the possibility to produce a larger image from a plurality of partial images from a camera in order to support a driver during parking. In this case, the image shows a parking space which was recorded in at least one of the partial images. It is therefore possible to show in the image not only the parking space or even only a part of the parking space, but rather a larger section of the surroundings or at least the entire parking space.

In an advantageous refinement, the driver is shown one or more of the partial images in a normal mode, and the entire assembled image in an extended mode when the parking space is detected as free. Consequently, what is shown depends on the situation and is done, in particular, with a larger image when a parking operation is imminent.

The parking space can be measured by means of an ultrasonic sensor. Such sensors are robust and reliable. They can sufficiently accurately detect delimitations of a parking space for measurement or optical display.

In a further embodiment, there is inserted into the image an artificial image element which represents a measurement of the parking space, an obstacle or a calculated parking track. In particular, it is also possible to show obstacles which lie outside the visual range of the camera system. The driver of the vehicle is able to drive his vehicle much more safely with this information.

Furthermore, there can be inserted into the image an image element representing an automatically proposed parking position, and the parking position can be varied by manually displacing the image element. The driver can therefore vary an automatically proposed parking position by simply inputting into an input means in the desired way.

In a further embodiment, a parking operation of the vehicle is carried out semiautomatically or fully automatically as the image is being shown. The driver can therefore better estimate or follow the parking operation.

Furthermore, the image can show a plurality of parking spaces in the vehicle surroundings, and the driver can select one of those for parking. Consequently, the image is used not only to visualize a parking operation into a prescribed parking space, but also to sensibly select one from a plurality of parking spaces.

The inventive imaging device can have a plurality of cameras. The images recorded in parallel with the cameras can then be used together with images recorded earlier by the cameras to produce an overall image. In this case, it can suffice for each of the individual cameras respectively to have a coverage area corresponding to a radius of less than 5 meters ("m"). This is sufficient, as a rule, for recording the critical surroundings of a vehicle, particularly for a parking operation.

As has already been indicated, it is particularly advantageous to integrate the imaging device in a driver assistance system and, in particular, in a parking assistance system. A vehicle equipped with such a driver assistance system can be driven very comfortably by a driver.

Other aspects and advantages of the invention will be apparent from the following description and the appended claims.

BRIEF DESCRIPTION OF DRAWINGS

The present invention is now explained in more detail with the aid of the attached drawings, in which:

FIG. 1 shows a bird's eye view of a parking situation with parallel parking spaces in relation to the carriageway;

FIG. 2 shows a block diagram of the circuit of a control unit with connected vehicle components;

DETAILED DESCRIPTION

Figure 3:
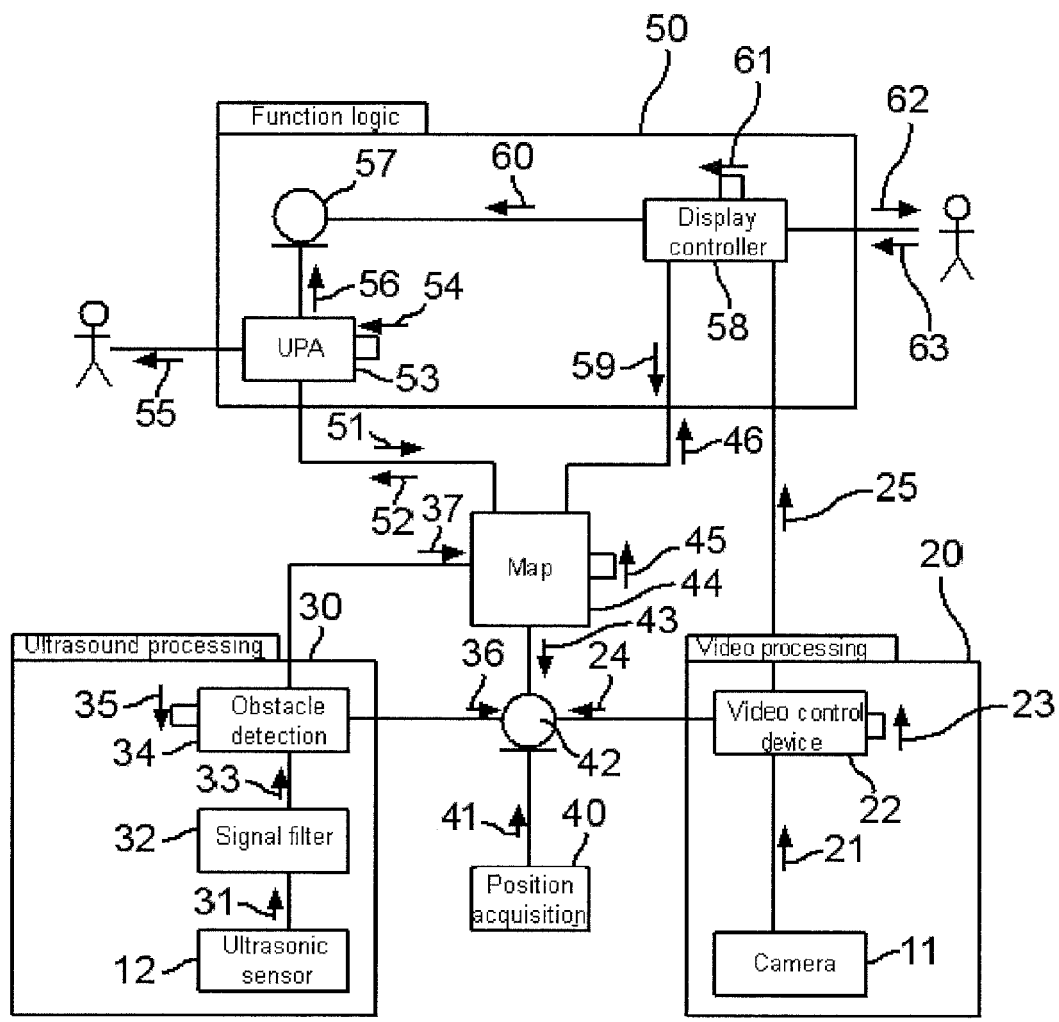
FIG. 3 shows a block diagram of the principle of a circuit of the control unit of FIG. 2.

The exemplary embodiments outlined in more detail below constitute embodiments of the present invention.

In contrast to the known systems for producing images of a vehicle surroundings, according to the invention the images obtained sequentially in different vehicle positions or alignments and/or positions of the camera are juxtaposed to one another such that it is possible to display an image of the vehicle surroundings which has a larger area than the coverage area of a single camera. The imaging device or the camera system can, in particular, be used during the measurement of a parking space to record a plurality of successive images, to store the latter and then to use the recorded images and the driving path, determined by means of path sensors (wheel sensors on the vehicle, if appropriate a steering angle sensor), to produce an extended image of the surroundings which covers the parking space and the obstacles delimiting the parking space. It is thereby possible for images which may be partially overlapping to be joined to form a new image, the new image combining image information from the individual images and resulting in a larger image.

The general approach consists in combining the functions of display and environmental acquisition. The HMI output resulting therefrom is particularly easy for the driver to understand. In this case, the surroundings of the vehicle are scanned by means of suitable sensing equipment, and an image of the surroundings is stored in a surroundings map (compare FIG. 6). The information which is stored in the surroundings map is further processed so that it is possible to detect individual obstacles and classify them. As an option, the risk of collision is likewise determined and, if required, values for a distance-to-collision and time-to-collision are calculated. The information which has been obtained by means of the surroundings map is used in the production of HMI images. In this case, the detected obstacles are inserted into the image directly at the correct points (obstacle highlighting). The dangerous obstacles are highlighted by being shown in a particular way. In addition, it is also possible to display distances as bars or numerical values. Furthermore, the predicted or planned trajectory, for example of a semiautomatic parking operation of the vehicle, is also inserted. This type of representation can be used both for images which are generated from a natural viewing angle (live view) and for images which are produced as a virtual bird's eye view (bird view).

As to the bird view variant, it is likewise possible to generate a virtual surroundings image (compare FIG. 1) over larger areas than the instantaneously visible area. In this case, individual bird view images are combined with odometry and, if appropriate, supplemented with further sensor information so as to result in a continuously enlarging virtual image. The advantage thereof is, for example, that directly after driving past with one's own car 1 at a detected parking space 2 it is possible to see the entire parking space area. At the same time, all detected obstacles 3, 4, 5, the target position 6 in the parking space 2 and the instantaneously planned trajectory (not drawn in FIG. 1) can be displayed. Such a display can also be used by the driver for an interactive correction of, for example, the target position. An appropriate input means is then provided in the vehicle in order to displace the image element, which is shown in the overall image as overlay element (target position 6). The system calculates therefrom the actual new parking position, and determines an appropriate new trajectory.

The camera or the cameras of the vehicle 1 record, if appropriate, a plurality of partial images from which a current image 7 (bird's eye view in FIG. 1 or enlarged live view image) is generated. FIG. 7 is therefore the result of a combination of images recorded at partially different times, these images each individually covering only part of image 7, possibly with overlapping. The generated overall image can be expanded with virtual objects which have not yet been seen by the camera, but have already been detected, for example by ultrasound. In accordance with example of FIG. 1, after the car 1 has passed the parking space 2 parallel to the carriageway a camera image 7 possibly assembled from a plurality of partial images is available up to half of the space 2. It was possible to use ultrasound to detect a kerbstone 4 or a wall. The detected parking space 2 together with the kerbstone 4 can already be shown beyond the camera image 7 in the image which is presented to the driver. If appropriate, even the kerbstone 4 behind the parking vehicles 3 and 5 is shown in the image when it has been recorded by sensing equipment of other type or interpreted by calculation. All these aspects help in bringing the camera image into a better connection with reality.

The camera image 7 reaches up to the boundary of the coverage area of the camera system. In the example of FIG. 7, however, the camera image 7 has not reached up to the kerbstone 4. For better orientation of the driver, the area between the boundary of the camera image 7 and the kerbstone 4 can be shown in colour. In the example of FIG. 1, for example, it would be possible to mark the parking space 2 or the target position 6 in green, and this tells the driver that the parking space is sufficiently large. Where the parking space is too short, the area from the coverage boundary of the camera system up to the edge of the kerbstone could, for example, be shown in grey. In particular, it can be shown with that colour which, for example, belongs to the carriageway or the optically acquired subarea of the parking space.

The kerbstone 4 outside the coverage area of the camera system is detected, with regard to position and size, by the ultrasound sensors. These measured variables are used to calculate a virtual object and its position in a fashion true to scale in the extended image, which is shown to the driver. The extended image is thus assembled from a camera image (possibly in a plurality of partial images) and the virtual objects, areas lying therebetween being expediently coloured in some circumstances. In the case of the bird's eye view, the "camera image" can be calculated from one or more live view images.

It is possible, in addition, for the live view variant, to insert the information from the surroundings map (compare FIG. 6) so that those parts of other obstacles that are covered by real obstacles in the image actually remain "hidden". This means that a virtual display of obstacles in the image is performed while taking account of the covering of the virtual display by obstacles in the real camera image. The result is an augmented reality image. Thus, by way of example in the display of a parking space with a kerbstone, the end of the kerbstone, which is covered by the obstacle at the end of the space, is not shown above the obstacle, but is appropriately masked out. This masking out is always to be dynamically adapted to the current image display or the current position of the vehicle. In order to enable this, the camera images are processed so that objects can be detected therein. In this case, the information from the surroundings map is used to calculate interesting areas and settings of algorithms.

A further display option relates to the insertion into the display units used by the driver of the information relating to the surroundings while taking account of the viewing angle of the driver relative to the respective display unit. Such display units include mirrors (side mirrors, rear view mirrors) and head-up displays at the front and rear windscreens, or a hologram display unit which moves the static or dynamic objects detected into the driver's field of vision. When the driver moves in the direction of an obstacle against which there is a warning, he is able there to detect as real and marked the object or obstacle against which there is a warning, and he understands the warning during the parking operation or the driving movement.

Of particular advantage is a display in combination with the electronic, camera based mirrors, in the case of which the image is produced purely electronically and suggests a mirror image. In this case, the map information can be inserted smoothly into all mirror images so that, no matter where he looks, the driver can always perceive the system view onto the obstacles, trajectory and so on.

FIG. 2 now shows a control unit 10 that is networked with a plurality of peripherals 11 to 16. This control unit 10 is capable of producing an image in accordance with the present invention. To this end, it receives appropriate image information or partial images from a camera 11 or a plurality of cameras. As shown by the double arrows at the interfaces, the control unit 10 can drive the camera 11 to record images. If appropriate, it is also possible to vary the alignment of the camera 11 via the control unit 10.

Moreover, the control unit 10 has ultrasonic sensors 12 as further suppliers of the input information. By way of example, said sensors supply distance information from the surroundings of the vehicle. The data link between ultrasonic sensor 12 and control unit 10 is again bidirectional, if appropriate.

Furthermore, an EPS (Electric Power Steering) is connected via a CAN-BUS to the control unit 10. It supplies the current steering angle to the control unit 10, and this is helpful or necessary for assembling the partial images to form the overall image. In addition, an ESP 14 (Electric Stabilization Program) is connected to the control unit via the CAN-BUS. The ESP 14 supplies movement data to the control unit 10. By way of example, said data comprise the wheel speed, the rolling direction, the yaw rate, the acceleration and the like.

Here, the control unit 10 is connected to a head unit 15 in order to output the image data. As an alternative to the head unit 15, it is possible to make use of any other optical output unit (for example display screen). A plurality of optical display units can also be driven by the control unit 10.

Furthermore, a loudspeaker 16, or a plurality of loudspeakers, serves/serve as acoustic output units for the control unit 10. In accordance with FIG. 2, it follows that there exists a monodirectional connection from the control unit 10 to the loudspeaker 16. Warnings can be supplied to the driver in the usual way via the loudspeaker 16.

The structure and the data flows of a system which implements the inventive solution are now explained with the aid of FIG. 3. The camera 11 is embedded in a video processing unit 20. It supplies raw video data 21 to a video control unit 22. As is indicated by the rectangle in the right hand edge of the box of the video control unit 22, the latter executes a video signal processing 23 in a processing loop. Provided in parallel to this there is an ultrasonic processing 30. It comprises the ultrasonic sensor 12. The latter supplies raw data 31 to a signal filter 32. The filtered sensor data 33 are fed to an obstacle detection unit 34. The latter continuously carries out a data analysis in a processing loop in order to detect obstacles.

A position detecting unit 40 (for example, odometry, ESP, EPS etc.) permanently supplies current position data 41 to a memory unit 42. The video control unit 22 and the obstacle detection unit 34 retrieve the respectively current position of the vehicle from this memory unit 42 with appropriate retrievals 24 and 36. Likewise, the current position is made available on retrieval 43 to a memory unit 44 in which the local map of the close surroundings of the vehicle (compare FIG. 6) is stored. The close surroundings relate, for example, to a circle of 30 m around the vehicle. Also stored in the memory unit 44 is obstacle information 37 from the obstacle detection unit 34. Object tracking 45 is carried out permanently in the memory unit 44. By way of example, in this case it is calculated in which direction an object is moving relative to the vehicle so that it can also be shown when it is located outside the detection area of the camera 11 or the ultrasonic sensors 12.

Upon request 51, a function logic 50 receives map data or obstacle information from the memory unit 44. In particular, the request 51 originates from an ultrasonic parking assistant 53 which also receives the desired information 52. Running permanently therein in a continuous processing loop is a check and calculation 54 of the distances. For example, it outputs appropriate warnings 55 to the driver via a loudspeaker. Moreover, segment data 56 of the ultrasonic parking assistant 53 is stored in a memory unit 57 of the function logic 50. These data relate, for example, to bars which must be inserted into an image.

A display control unit 58 of the function logic 50 receives processed video data 25 from the video control unit 22. Furthermore, upon request 59 the display control unit 58 receives map data or obstacle information 46 from the memory unit 44. Further, the display control unit 58 reads the ultrasonic segment data from the memory unit 57 by an appropriate reading request 60. An adaptation and production process 61 for overlay elements runs continuously in the display control unit 58.

The display control unit 58 actuates an output 62, for example to a display screen or a head unit which respectively form an optical interface to the driver. An interaction 63 takes place between driver and display control unit 58. By way of example, in this case the driver is able to vary the display or, for example, to displace an element in the image (for example, displace the parking position marking).

Figure 4:
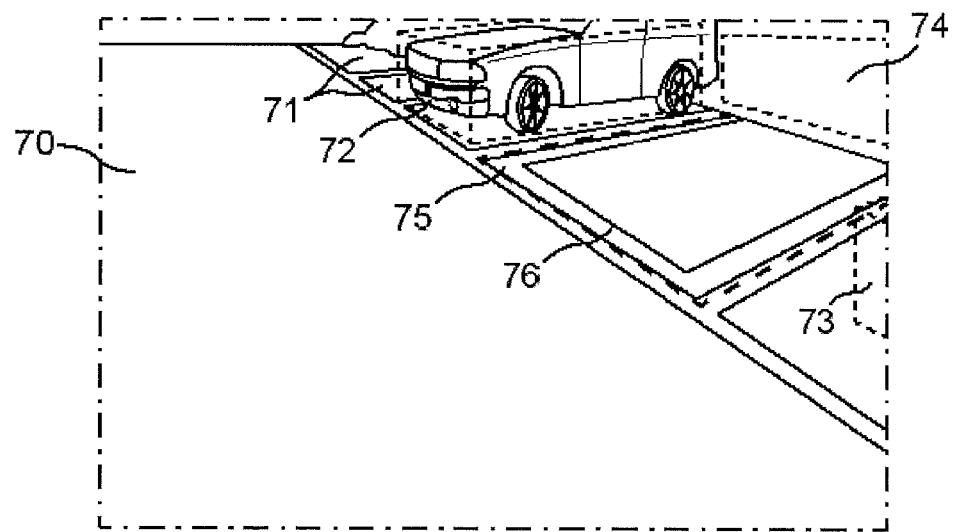
FIG. 4 shows a live view produced in accordance with the invention.
Figure 5:
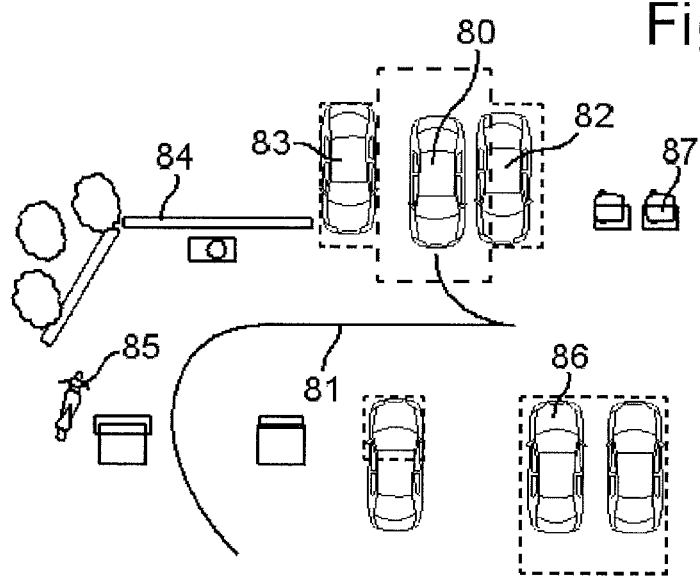
FIG. 5 shows a map of the surroundings in a schematic illustration.
Figure 6:
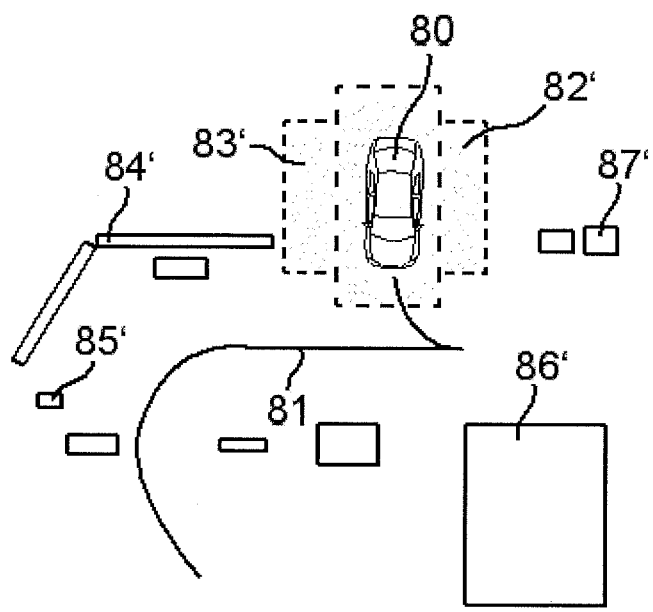
FIG. 6 shows a map view such as can be produced by an inventive imaging device.

Particular examples may now be better understood using the above presented background information with the aid of FIGS. 4 to 6. FIG. 4 represents a live view display which is, if appropriate, assembled from a plurality of partial images. There is to be seen a carriageway 70 on the right-hand side of which parking places 71 are located. Located respectively on two of the parking places 71 is a detected obstacle 72, 73. Although the obstacle 73 is not located in the coverage area of the camera, it is displayed as a virtual object, since it has been detected in an earlier image or via another sensor. It has been brought along for the current display. Furthermore, the system has detected a wall 74 as obstacle. Located between the two vehicles, that is to say the obstacles 72 and 73 and the wall 74 is a parking space 75 which the system detects and inserts with perspective exactitude in the live view image with a rectangular overlay element. Within the parking space 75, the system calculates a target position 76, which is likewise marked in the live view image by a rectangular overlay element. If appropriate, a trajectory is further inserted into the image for a parking operation.

The image illustrated in FIG. 4 can be assembled from a plurality of partial images which have been obtained sequentially in different vehicle positions. For example, the image can also be enlarged or extended at the right hand edge so that it is then also possible to see the obstacle 73 in order to facilitate the orientation for the driver.

FIGS. 5 and 6 will now be used to present an application of the inventive system, that is to say the imaging device of the parking system of a vehicle in the case of a bird's eye view display. Firstly, FIG. 5 shows a real situation in a schematic display. A vehicle 80 is parking between two vehicles 82 and 83 in accordance with a trajectory 81. Located on the car park are numerous further obstacles such as, for example, a wall 84, a motorcycle 85, further vehicles 86 and dustbins 87. During driving on the car park, the imaging device of the vehicle 80 records these obstacles and prepares therefrom a map such as is shown in FIG. 6. Each obstacle is symbolized by the block 82' to 87', that is to say a virtual object. For example, the motorcycle 85 is symbolized by the block 85'. The image (FIG. 6) presented to the driver shows all objects or obstacles (here signified as blocks) relevant to him, and a top view of his own car 80 and the parking trajectory 81. The driver can therefore better orientate himself on the car park for the parking operation. If appropriate, a plurality of parking spaces are offered in the image, from which he can select one interactively.

Conventional camera systems comprise at least one reversing camera and side cameras (for example in the external mirrors or corner regions of the bumpers). Said camera systems have a coverage area of approximately 2 m to 4 m range around the vehicle. Said coverage area does not as a rule suffice to display the parking spaces over their entire extent along the driving path. In the present example, the camera images are therefore combined to form an overall image from a virtual viewpoint above the vehicle (bird view). As shown here, the successively recorded images can be used, in particular, to measure a parking space. To this end, the recorded images are stored and an extended surroundings image is produced therefrom with the aid of the driving path determined by means of path sensors (wheel sensors on the vehicle, if appropriate a steering angle sensor). Said image reproduces the parking space and the obstacles delimiting the parking space, for example in accordance with FIG. 6.

The inventive camera system has, in particular, a normal mode (display of the current camera images with 2 m to 4 m coverage area) and an extended mode (using images from the past). The extended mode is actuated, in particular, after the measurement of a parking space when the driver is shown the parking space as free. The parking operation can then be performed semiautomatically (only steering) or fully automatically (steering and braking).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. Method for producing an image of a vehicle surroundings of a vehicle with at least one camera comprising:
   recording a first partial image in a first position or alignment of the camera; and
   recording at least a second partial image in at least a second position or alignment of the camera,
   each partial image corresponding to the entire coverage area of the camera,
      wherein the same camera records the first partial image and the second partial image,
      wherein the vehicle, equipped with the camera, moves during a time between the recording of the first partial image and the recording of the second partial image,
      wherein, as a result of the vehicle movement, the second position or alignment of the camera is different from the first position or alignment of the camera,
      wherein the first partial image and the second partial image are assembled to form the image of the vehicle surroundings such that the image shows a larger area than each partial image,
      wherein the image of the vehicle surroundings shows a parking space, which was recorded in at least one of the partial images, and
   wherein the driver is shown one or more of the partial images in a normal mode, and the entire assembled image in an extended mode when the parking space is detected as free, wherein there is inserted into the image an artificial image element which represents a measurement of the parking space, an obstacle or a calculated parking track.

2. Method according to claim 1,
   wherein the image has a virtual viewpoint above the vehicle.

3. Method according to claim 1,
   wherein the parking space is measured by at least one ultrasonic sensor.

4. Method according to claim 1,
   wherein there is inserted into the image an image element representing an automatically proposed parking position, and the parking position is varied by manually displacing the image element.

5. Method according to claim 1,
   wherein a parking operation of the vehicle is carried out semiautomatically or fully automatically as the image is being shown.

6. Method according to claim 1,
   wherein the image shows a plurality of parking spaces in the vehicle surroundings, and the driver selects one of those for parking.

7. Method according to claim 3,
   wherein there is inserted into the image an image element representing an automatically proposed parking position, and the parking position is varied by manually displacing the image element.

8. Method for supporting a driver during parking by producing the image in accordance with claim 2, in which the image shows a parking space which was recorded in at least one of the partial images.

9. Imaging device for producing an image of a vehicle surroundings of a vehicle comprising:
   a camera that records a first partial image in a first position or alignment, and that records at least a second partial image in at least a second position or alignment of the camera, each partial image corresponding to the entire coverage area of the camera,
      wherein the same camera records the first partial image and the second partial image,
      wherein the vehicle, equipped with the camera, moves during a time between the recording of the first partial image and the recording of the second partial image,
      wherein, as a result of the vehicle movement, the second position or alignment of the camera is different from the first position or alignment of the camera, and
   an image synthesis device with which the first partial image and the second partial image can be assembled to form the image of the vehicle surroundings such that the image shows a larger area than each partial image,
   wherein the image of the vehicle surroundings shows a parking space, which was recorded by the camera in at least one of the partial images, and
   wherein the driver is shown one or more of the partial images recorded by the camera in a normal mode, and the entire assembled image from the image synthesis device in an extended mode when the parking space is detected as free, wherein there is inserted into the image an artificial image element which represents a measurement of the parking space, an obstacle or a calculated parking track.

10. Imaging device according to claim 9, further comprising:
    a plurality of cameras in each case having a coverage area corresponding to a radius of less than 5 meters.

11. Driver assistance system with an imaging device according to claim 9.

12. Vehicle with a driver assistance system according to claim 11.

* * * * *